United States Patent
Seo et al.

(10) Patent No.: US 12,524,348 B2
(45) Date of Patent: Jan. 13, 2026

(54) OPERATING METHOD OF SET-ASSOCIATIVE CACHE AND SYSTEM INCLUDING SET-ASSOCIATIVE CACHE

(71) Applicant: Samsung Electronics Co., Ltd., Suwon-si (KR)

(72) Inventors: Seulgi Seo, Suwon-si (KR); Junhee Yoo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 155 days.

(21) Appl. No.: 18/505,247

(22) Filed: Nov. 9, 2023

(65) Prior Publication Data
US 2024/0248848 A1   Jul. 25, 2024

(30) Foreign Application Priority Data
Jan. 20, 2023  (KR) .................. 10-2023-0009033

(51) Int. Cl.
*G06F 12/0864*  (2016.01)

(52) U.S. Cl.
CPC .. *G06F 12/0864* (2013.01); *G06F 2212/6032* (2013.04)

(58) Field of Classification Search
CPC ......... G06F 12/0864; G06F 2212/6032; G06F 2212/1028; G06F 1/3234; G06F 3/0658; G06F 12/121; Y02D 10/00
USPC ....................................... 365/185.23, 185.24
See application file for complete search history.

(56) References Cited

U.S. PATENT DOCUMENTS

| | | | |
|---|---|---|---|
| 5,761,715 A * | 6/1998 | Takahashi | G06F 1/3275 711/147 |
| 5,854,761 A * | 12/1998 | Patel | G11C 7/1042 711/E12.056 |
| 8,335,122 B2 | 12/2012 | Dreslinski, Jr. et al. | |
| 10,073,787 B2 | 9/2018 | Reed et al. | |
| 10,339,023 B2 | 7/2019 | Wang et al. | |
| 10,528,473 B2 | 1/2020 | Wilkerson et al. | |
| 2003/0234971 A1* | 12/2003 | Murade | G02F 1/136209 257/E27.111 |
| 2008/0123458 A1* | 5/2008 | Cheng | G11C 11/413 327/544 |
| 2010/0128541 A1* | 5/2010 | Russell | G11C 11/419 365/230.01 |
| 2013/0320422 A1* | 12/2013 | Chang | H10B 12/37 438/243 |

(Continued)

FOREIGN PATENT DOCUMENTS

| | | |
|---|---|---|
| KR | 101902651 B1 | 11/2018 |
| KR | 1020210114495 A | 9/2021 |
| KR | 1020220078566 A | 6/2022 |

*Primary Examiner* — Michael T Tran
(74) *Attorney, Agent, or Firm* — Muir Patent Law, PLLC

(57) ABSTRACT

An operating method of a set-associative cache includes selecting one way group from among a first way group and a second way group with different threshold voltages based on an operation state of the set-associative cache, increasing a number of ways to which power is supplied in the selected one way group, analyzing a change in an operation state of a system including the set-associative cache as the number of ways to which the power is supplied is increased, and determining whether to further increase the number of ways to which the power is supplied based on an analyzed change in the operation state of the system.

20 Claims, 17 Drawing Sheets

(56) References Cited

U.S. PATENT DOCUMENTS

| | | | |
|---|---|---|---|
| 2014/0246715 A1* | 9/2014 | Kamal | H10D 84/217 |
| | | | 257/300 |
| 2017/0046266 A1* | 2/2017 | McIlvaine | G06F 12/126 |
| 2020/0403813 A1* | 12/2020 | Suresh | G06F 7/584 |
| 2022/0051728 A1* | 2/2022 | Chai | G11C 16/3459 |
| 2022/0139927 A1* | 5/2022 | Chang | H10B 12/50 |
| | | | 257/296 |
| 2022/0173108 A1* | 6/2022 | Lee | H01L 23/53266 |
| 2022/0223604 A1* | 7/2022 | Park | H10B 12/30 |

* cited by examiner

OPERATING METHOD OF SET-ASSOCIATIVE CACHE AND SYSTEM INCLUDING SET-ASSOCIATIVE CACHE

CROSS-REFERENCE TO RELATED APPLICATION

This application is based on and claims priority under 35 U.S.C. § 119 to Korean Patent Application No. 10-2023-0009033, filed on Jan. 20, 2023, in the Korean Intellectual Property Office, the disclosure of which is incorporated by reference herein in its entirety.

BACKGROUND

An aspect of the inventive concept relates to an operating method of a set-associative cache and a system including the set-associative cache. More specifically, the inventive concept relates to an operating method of a set-associative cache including way groups with different threshold voltages.

A cache reduces data access delay in a memory hierarchy. Data fetched from a cache save time for a central processing unit (CPU) to access a lower-level memory. A hit rate and hit time of a cache are related to a structure of the cache. A set-associative cache has an efficient structure configured by considering both a hit rate and hit time.

A larger size cache may be desirable for a process that demands large amounts of data and high speed. However, disorderly use of a large-sized cache may result in a reduction in power efficiency.

SUMMARY

The inventive concept provides an operating method of a set-associative cache including an operation state of the system.

According to an aspect of the inventive concept, an operating method of a set-associative cache is provided.

The operating method of a set-associative cache includes selecting, based on an operation state of the set-associative cache, one way group from among a first way group and a second way group with different threshold voltages, wherein the first way group and the second way group are in the same set of the set-associative cache, wherein the first way group includes a first number of a plurality of first ways having a plurality of first transistors having a first threshold voltage, and wherein the second way group includes a second number of a plurality of second ways having a plurality of second transistors having a second threshold voltage different from the first threshold voltage, increasing a number of ways to which power is supplied in the selected one way group, analyzing a change in an operation state of a system including the set-associative cache as the number of ways to which the power is supplied in the selected one way group is increased, and determining, based on an analyzed change in the operation state of the system, whether to further increase the number of ways to which the power is supplied in the selected one way group.

According to another aspect of the inventive concept, a system is provided.

The system includes a set-associative cache and a controller configured to perform an operating method of the set-associative cache. The controller is configured to select, based on an operation state of the set-associative cache, one way group from among a first way group and a second way group with different threshold voltages, wherein the first way group and the second way group are the same set of the set-associative cache, wherein the first way group includes a plurality of first transistors having a first threshold voltage and a first number of a plurality of ways, and wherein the second way group includes a plurality of second transistors having a second threshold voltage different from the first threshold voltage and a second number of a plurality of ways, increase a number of ways to which power is supplied in the selected one way group, analyze a change in an operation state of a system including the set-associative cache as the number of ways to which the power is supplied in the selected one way group is increased, and determine whether to further increase the number of ways to which the power is supplied based on an analyzed change in the operation state of the system.

According to another aspect of the inventive concept, an operating method of a set-associative cache is provided.

The operating method of a set-associative cache includes analyzing throughput of an IP block, selecting, based on an analyzed throughput of the IP block, at least one way group from among a first way group and a second way group with different threshold voltages, wherein the first way group and the second way group are in the same set of the set-associative cache, wherein the first way group includes a first number of a plurality of first ways having a plurality of first transistors having a first threshold voltage, and wherein the second way group includes a second number of a plurality of second ways having a plurality of second transistors having a second threshold voltage different from the first threshold voltage, and increasing a number of ways to which power is supplied in the selected at least one way group.

BRIEF DESCRIPTION OF THE DRAWINGS

Embodiments will be more clearly understood from the following detailed description taken in conjunction with the accompanying drawings in which.

DETAILED DESCRIPTION OF THE EMBODIMENTS

Hereinafter, various embodiments are described with reference to the accompanying drawings.

Figure 1:
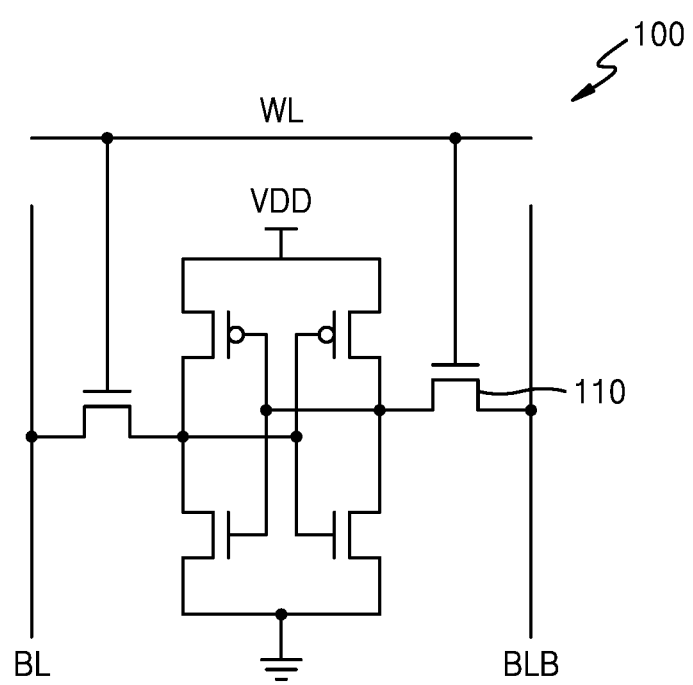
FIG. 1 illustrates a static random access memory (SRAM) cell according to an embodiment.

FIG. 1 illustrates a SRAM cell according to an embodiment.

According to one example, the SRAM cell may be implemented with transistors, and FIG. 1 illustrates a basic SRAM cell including six transistors.

An SRAM cell 100 may include a transistor 110 formed according to a multi-threshold voltage design. For example, the transistor 110 may be a pass transistor of the SRAM cell 100. A word line WL may be connected to a gate electrode of the transistor 110. A bit line BL or a complementary bit line BLB may be connected to a source/drain electrode of the transistor 110. In some embodiments, the SRAM cell 100 may include two pass transistors each of which a gate electrode is connected to the word line WL. The bit line BL may be connected to a source/drain electrode of one of the two pass transistors, and the complementary bit line BL may be connected to a source/drain electrode of the other. The outputs of a latch formed of four transistors between the two pass transistors may be connected to the first and second pass transistors. The transistor 110 may be implemented as a super low voltage threshold (SLVT) transistor, a low voltage threshold (LVT) transistor, a regular voltage threshold (RVT) transistor, or a high voltage threshold (HVT) transistor according to the multi-threshold voltage design.

Power to be consumed includes dynamic power and static power. The dynamic power is consumed by switching of a transistor, and the static power is consumed by a leakage current. The transistor is a switch that operates according to a gate voltage. The leakage current (i.e., a sub-threshold leakage current) may flow even when the transistor is turned off because a gate voltage thereof is lower than a threshold voltage.

The HVT transistor has a high threshold voltage to reduce a sub-threshold leakage current, and accordingly, the HVT transistor has small power leakage but has slow switching speed due to switching delay. The SLVT has a low threshold voltage to increase switching speed, but has large sub-threshold leakage current (i.e., large consumption of static power). The switching speed may become slower in ascending order of SLVT, LVT, RVT, and HVT, and power leakage may increase in ascending order of HVT, RVT, LVT, and SLVT.

The cache may be implemented with SRAMs based on multiple threshold voltage transistors. In the cache, when power is supplied to an SRAM based on a transistor with a high threshold voltage, the SRAM operates with relatively small power leakage and low switching speed, and when power is supplied to an SRAM based on a transistor with a low threshold voltage, the SRAM operates with relatively large power leakage and high switching speed. In order to efficiently operate the cache, the inventive concept provides an operating method of a cache that selectively supplies power to an SRAM based on multi-threshold voltage transistors by considering an operation state of a system and an operation state of the cache.

Figure 2:
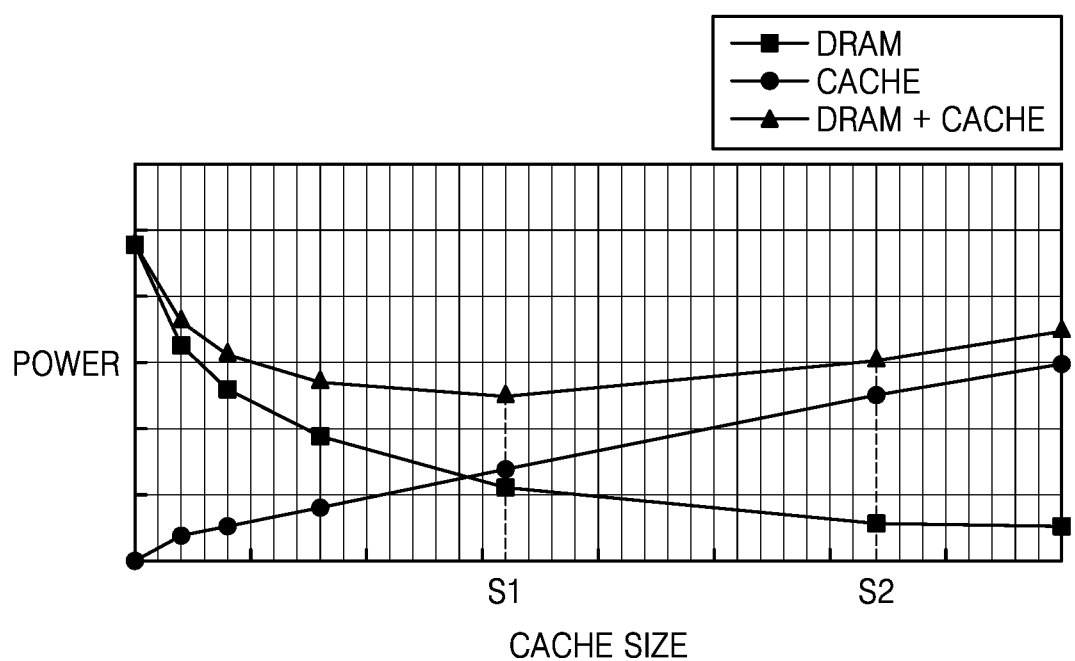
FIG. 2 illustrates a cache size-power graph according to an embodiment.

FIG. 2 illustrates a cache size-power graph according to an embodiment.

A cache may be implemented with the SRAM of FIG. 1. A system may include an L1 cache, an L2 cache, and so on according to a memory hierarchy. L in L1 and L2 indicates a level. The L1 cache may refer to a cache of the highest level among caches. The L2 cache may refer to a cache of a level following L1. A last level cache (LLC) may refer to a cache of the lowest level among caches. In general, the LLC may have the most power leakage due to the largest size in a cache hierarchy.

Advanced technologies such as high-resolution images, game graphics, and artificial intelligence (AI) may demand an increase in cache size. The graph illustrated in FIG. 2 illustrates cache power consumption and dynamic random access memory (DRAM) power consumption according to the cache size. As the cache size increases, power consumption of DRAM decreases due to the reduced use of DRAM. In addition, as the cache size increases, not only dynamic power of a cache but also static power increase, and accordingly, power consumption of the cache increases. The sum of power consumption of the cache and power consumption of the DRAM is greater when the cache size is S2 than when the cache size is S1. This means that power efficiency has to be considered when using a cache large in size.

Figure 3:
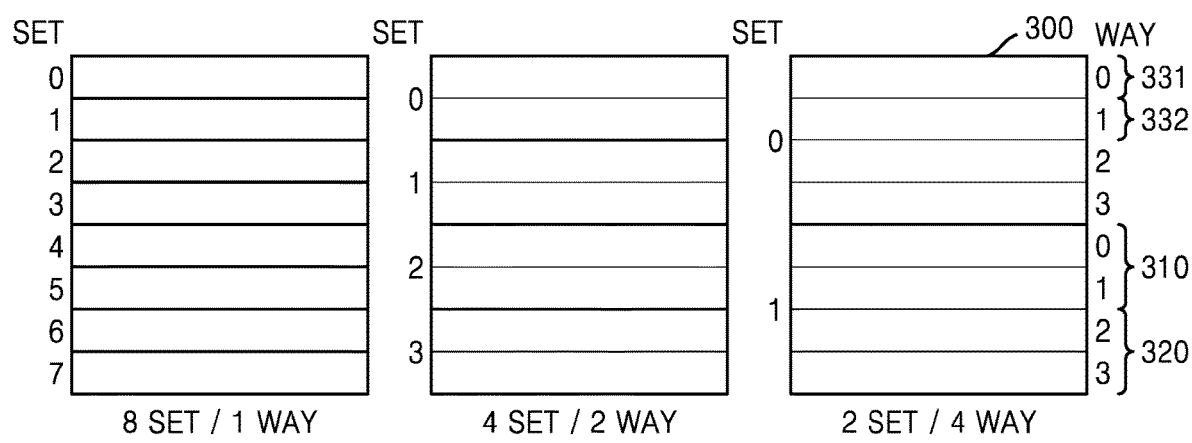
FIG. 3 is a diagram illustrating a set-associative cache according to an embodiment.

FIG. 3 is a diagram illustrating a set-associative cache according to an embodiment.

FIG. 3 illustrates a 1-way set-associative cache, a 2-way set-associative cache, and a 4-way set-associative cache. The 1-way set-associative cache includes eight 1-way sets, the 2-way set-associative cache includes four 2-way sets, the 4-way set-associative cache includes two 4-way sets.

The set-associative caches may include SRAMs with different threshold voltages. The SRAMs may be different in power leakage and operating speed depending on threshold voltages of transistors. For example, LVT-based SRAM may have greater power leakage and higher operating speed than RVT-based SRAM.

The set-associative caches may each include ways with different threshold voltages. For example, in the 4-way set-associative cache, a way 0 of a set 0 331 may include RVT-based SRAM and a way 1 of the set 0 332 may include LVT-based SRAM. In this case, power leakage of the way 1 is larger than power leakage of the way 0 and operating speed of the way 1 may be greater than operating speed of the way 0.

A set-associative cache may include way groups different in threshold voltage. For example, in a 4-way set-associative cache 300, a way 0 and a way 1 of a set 1 may be a first way group 310 including RVT-based SRAM, and a way 2 and a way 3 of the set 1 may be a second way group 320 including LVT-based SRAM. In this case, power leakage of the second way group 320 may be greater than power leakage of the first way group 310, and operating speed of the second way group 320 may be greater than operating speed of the first way group 310.

Figure 4:
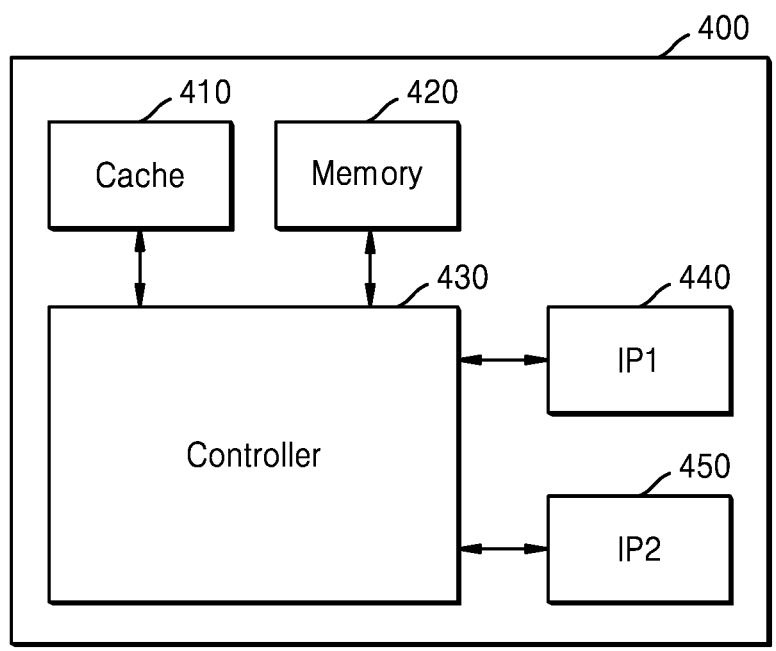
FIG. 4 is a block diagram illustrating a system according to an embodiment.

FIG. 4 is a block diagram illustrating a system 400 according to an embodiment.

The system 400 may include a system on chip in which blocks having various functions are integrated into a single semiconductor chip. The system 400 may be mounted on an electronic device, such as a smartphone, a tablet personal computer (PC), a mobile phone, a personal digital assistant (PDA), a laptop computer, a wearable device, a global positional system (GPS) device, an e-book terminal, a digital broadcasting terminal, a moving picture experts group (MPEG) audio layer 3 (MP3) player, a digital camera, or a wearable computer. For example, the electronic device may also include an internet of things (IOT) device, and an electric vehicle. The system 400 may include a processor that controls operation of an electronic device. The system 400 may indicate an application processor (AP), a mobile AP, or a control chip.

The system 400 may include a plurality of intellectual property (IP) blocks having an IP1 block 440 and an IP2 block 450, a cache 410, a memory 420, and a controller 430. Each of the IP1 block 440 and the IP2 block 450 may be a unit module or a combination of unit modules designed to perform a preset function of the system 400. In an embodiment, components included in one of the IP1 block 440 and the IP2 block 450 may operate based on the same clock and voltage.

Each of the IP1 block 440 and the IP2 block 450 includes a central processing unit (CPU), a graphics processing unit (GPU), a processor, each core of a multi-core processor, a power management unit (PMU), a clock management unit (CMU), a system bus, memory, a universal serial bus (USB), peripheral component interconnect (PCI), a digital signal processor (DSP), a wired interface, a wireless interface, a controller, embedded software, codec, a video module (for example, a camera interface, a joint photographic experts group (JPEG) processor, a video processor (or a mixer or so on), a three-dimensional (3D) graphics core, an audio system, a driver, or so on. The IP1 block 440 and the IP2 block 450 may be implemented in hardware, software (or firmware), or a combination of hardware and software.

Although FIG. 4 illustrates that the system 400 includes the IP1 block 440 and the IP2 block 450, but this is for the sake of convenience of description, and the number and type of the IP1 block 440 and the IP2 block 450 may be variously changed.

The cache 410 may indicate a cache of at least one level in a cache hierarchy according to a memory hierarchy. The cache 410 may indicate at least one of an L1 cache, an L2 cache, and an LLC. The cache 410 may be mounted inside or outside the IP1 block 440 or the IP2 block 450. The cache 410 may include or may be a set-associative cache.

Each set in a set-associative cache may include SRAMs with different threshold voltages. Ways of a set may be grouped depending on threshold voltages. For example, a set may include a first way group including HVT-based SRAM, a second way group including RVT-based SRAM, a third way group including LVT-based SRAM, and a fourth way group including SLVT-based SRAM.

The memory 420 may indicate a lower level memory rather than a cache in a memory hierarchy. The memory 420 may be a main memory but is not limited thereto. The memory 420 may include DRAM. However, the memory 420 is not limited thereto and may include volatile memory, such as DRAM and SRAM, or nonvolatile memory, such as flash memory, phase-change RAM (PRAM), magnetic RAM (MRAM), resistive RAM (ReRAM), and ferroelectrics RAM (FRAM).

The controller 430 may perform an operating method of a set-associative cache, according to an embodiment. The controller 430 may include at least one IP blocks. The controller 430 may be implemented in hardware, software, or a combination thereof. The controller 430 may include at least one of a cache controller, a power controller, and a clock controller.

The controller 430 may receive an operation state of the cache 410. The controller 430 may receive a clock frequency of the cache 410 and a supply voltage of the cache 410 as an operation state of the cache 410. The controller 430 may select at least one way group from among a plurality of way groups according to an operation state of the cache 410 and increase the number of ways to which power is supplied in the selected at least one way group.

The controller 430 may receive an operation state of the system 400. The controller 430 may receive a way in which power is supplied in the cache 410, power consumption of the cache 410, power consumption of the memory 420, power consumption of the IP1 block 440 and the IP2 block 450, or performance metrics of the IP1 block 440 and the IP2 block 450 as an operation state of the system 400. The performance metrics of the IP1 block 440 and the IP2 block 450 may each include execution time, frame per second (fps), or instruction per clock (IPC), but is not limited thereto. In addition, the performance metrics of the IP1 block 440 and the IP2 block 450 may each include response time, latency, throughput, or performance per watt, but is not limited thereto. The controller 430 may increase the number of ways to which power is supplied according to an operation state of the system 400. For example, for the convenience of description, if a set has two ways groups and each way group has four ways, a number of ways to which power is supplied may be 1, 2, 3 or 4 (all of the ways) depending on an operation state of the system 40. In some embodiments, the set has 8 ways, and the two way groups may have the same number of ways (e.g., 4 ways per each way group). The present invention is not limited thereto. In some embodiments, a first way group of the two way groups may have 2 ways, and the second way group of the two way groups may have 6 ways. Each way group may have or may be formed of SRAMs with the same threshold voltage. For example, the controller 430 may map the addresses of SRAMs with the same threshold voltage to the same way group. The way group will be described in detail with reference to FIG. 5.

Figure 5:
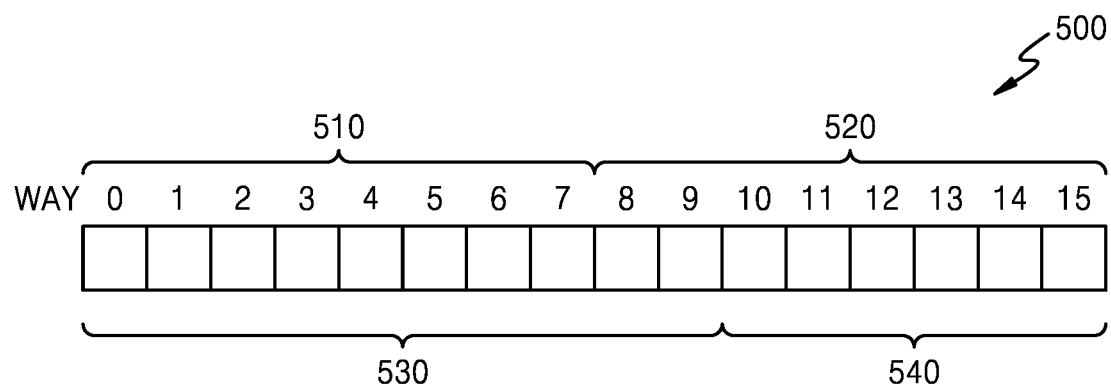
FIG. 5 is a diagram illustrating a way group according to an embodiment.

FIG. 5 is a diagram illustrating a way group according to an embodiment.

A set 500 of a set-associative cache may include a plurality of way groups. For the sake of convenience of description, the set 500 of the set-association cache according to an embodiment may include a first way group 510 and a second way group 520. However, it should be understood that the embodiment may also be applied to a set of a set-associative cache including three or more way groups.

The first way group 510 may include the same number of ways as the second way group 520. For example, the first way group 510 may include a way 0 to a way 7, and the second way group 520 may include a way 8 to a way 15. Alternatively, the set 500 may include a first way group 530 and a second way group 540 which are different from each other in the number of ways. For example, the first way group 530 may include a way 0 to a way 9, and the second way group 540 may include a way 10 to a way 15.

The first and second way groups 510 and 520 or the first and second way groups 530 and 540 may be implemented with transistors with different threshold voltages. According to an example, the first way group 510 or 530 may be implemented with transistors with a higher threshold voltage than the second way group 520 or 540. Accordingly, the first way group 510 or 530 may have a slower operating speed and less power leakage than the second way group 520 or 540. For example, the first way group 510 or 530 may include RVT-based SRAM, and the second way group 520 or 540 may include LVT-based SRAM, but are not limited thereto.

FIGS. 6 to 11 are flowcharts illustrating methods of selecting a way group according to embodiments.

The controller 430 of FIG. 4 may select one way group from among a first way group and a second way group based on an operation state of a set-associative cache. Because the first way group is implemented with transistors with a higher threshold voltage than the second way group, operating speed of the first way group may be less than operating speed of the second way group, and power leakage of the first way group may be less than power leakage of the second way group.

Figure 6:
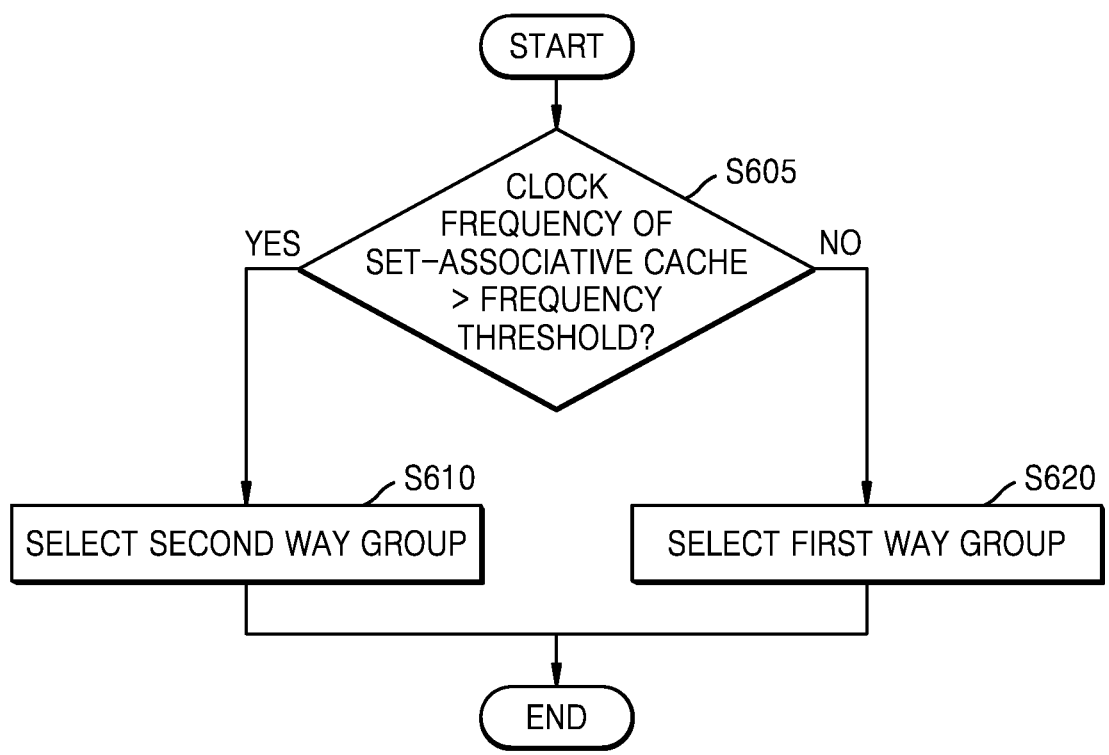
FIGS. 6 to 11 are flowcharts illustrating methods of selecting a way group, according to embodiments.

Referring to FIG. 6, the controller 430 may select one of a first way group and a second way group based on comparison between a clock frequency of a set-associative cache and a frequency threshold (S605). The frequency threshold may be a previously determined value. When the clock frequency of the set-associative cache is greater than the frequency threshold (Yes), a fast way may be desirable. Accordingly, the controller 430 may select the second way group when the clock frequency of the set-associative cache is greater than the frequency threshold (Yes) (S610), and otherwise (No), the controller 430 may select the first way group (S620).

When the clock frequency of the set-associative cache is greater than the frequency threshold, the controller 430 may select the second way group of high speed, and thus, system may be prevented from being delayed. In other cases, by selecting the first way group with a small power leakage, power consumption of the system 400 may be reduced.

Figure 7:
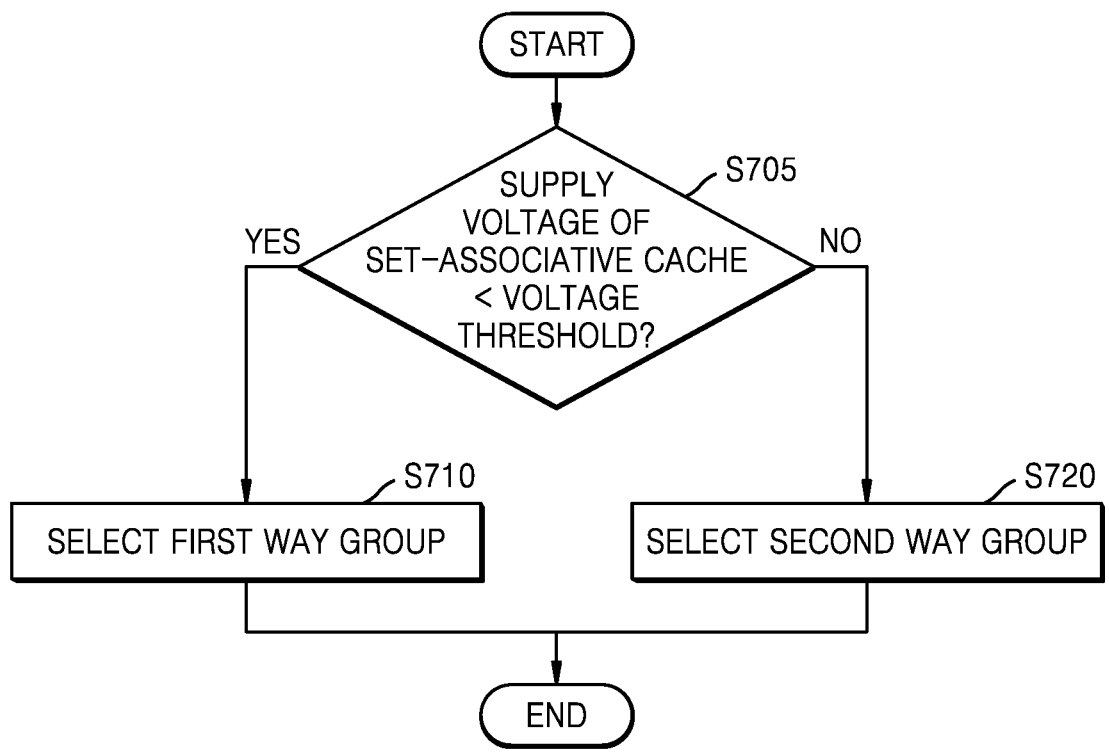

Referring to FIG. 7, the controller 430 may select one of a first way group and a second way group based on comparison between a supply voltage of a set association cache and a voltage threshold (S705). The voltage threshold may be previously determined. When a voltage supplied to the set-associative cache is less than the voltage threshold, a way with low power leakage may be required. Accordingly, the controller 430 may select the first way group when the supply voltage of the set-associative cache is less than the voltage threshold (Yes) (S710), and otherwise (No), the controller 430 may select the second way group (S720).

When the supply voltage of the set-associative cache is less than the voltage threshold, the controller 430 may select the first way group with low power leakage, and thus, power consumption may be reduced. In other cases, by selecting the second way group with high operating speed, the controller 430 may correspond to high-speed operation of the system 400.

Figure 8:
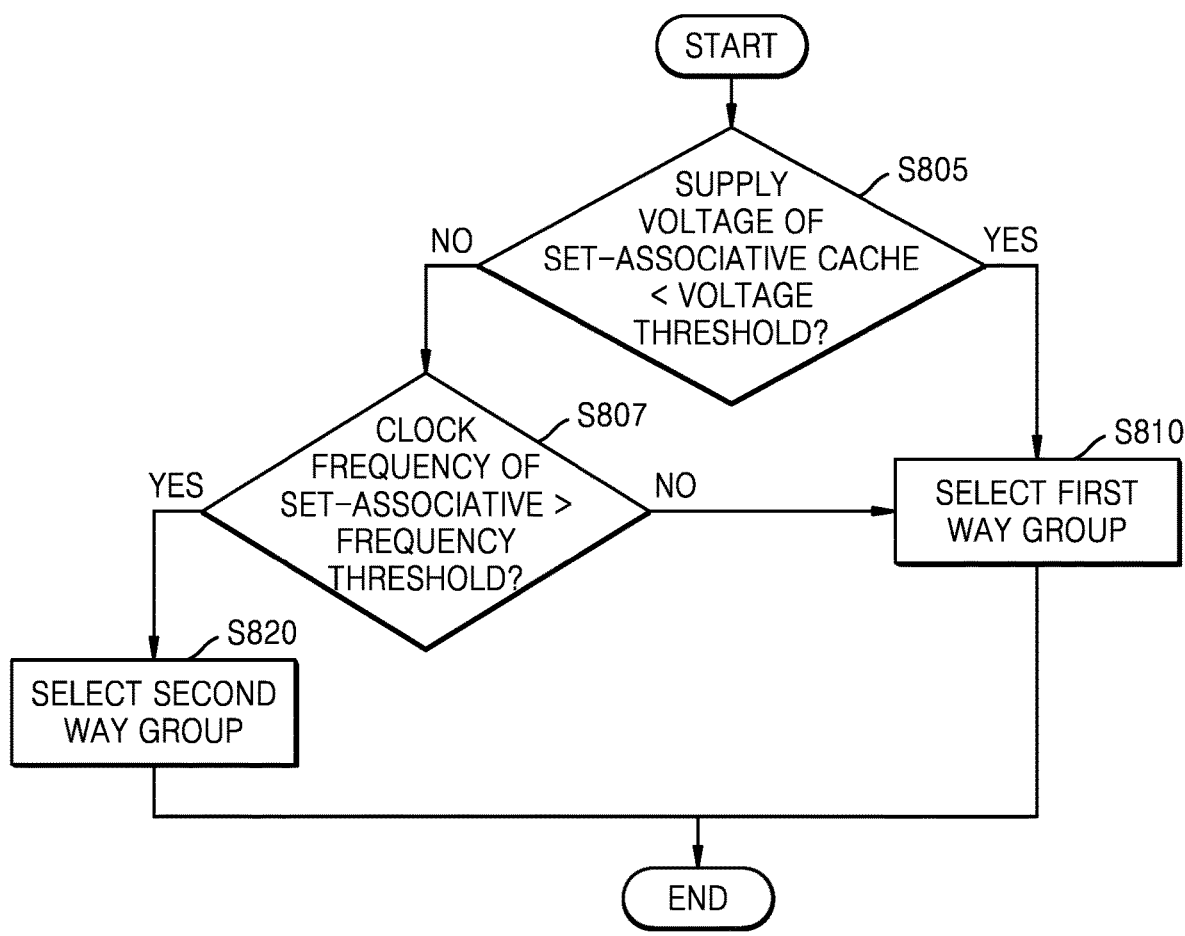

Referring to FIG. 8, the controller 430 may select one way group from among the first way group and the second way group based on comparison between a supply voltage of a set-associative cache and a voltage threshold (S805) and comparison between a clock frequency of the set-associative cache and a frequency threshold (S807).

When the supply voltage of the set-associative cache is less than the voltage threshold (Yes), the controller 430 may select the first way group (S810). When the supply voltage of the set-associative cache is less than the voltage threshold, the system 400 may be in a low power state. In this case, the controller 430 may select the first way group by prioritizing power consumption more than operating speed.

When the supply voltage of the set-associative cache is not less than the voltage threshold (No), the controller 430 selects one of the first way group and the second way group based on comparison between a clock frequency of the set-associative cache and a frequency threshold. When the clock frequency of the set-associative cache is greater than the frequency threshold (Yes) (S820), the controller 430 may select the second way group and may select the first way group in other cases (No) (S810).

Figure 9:
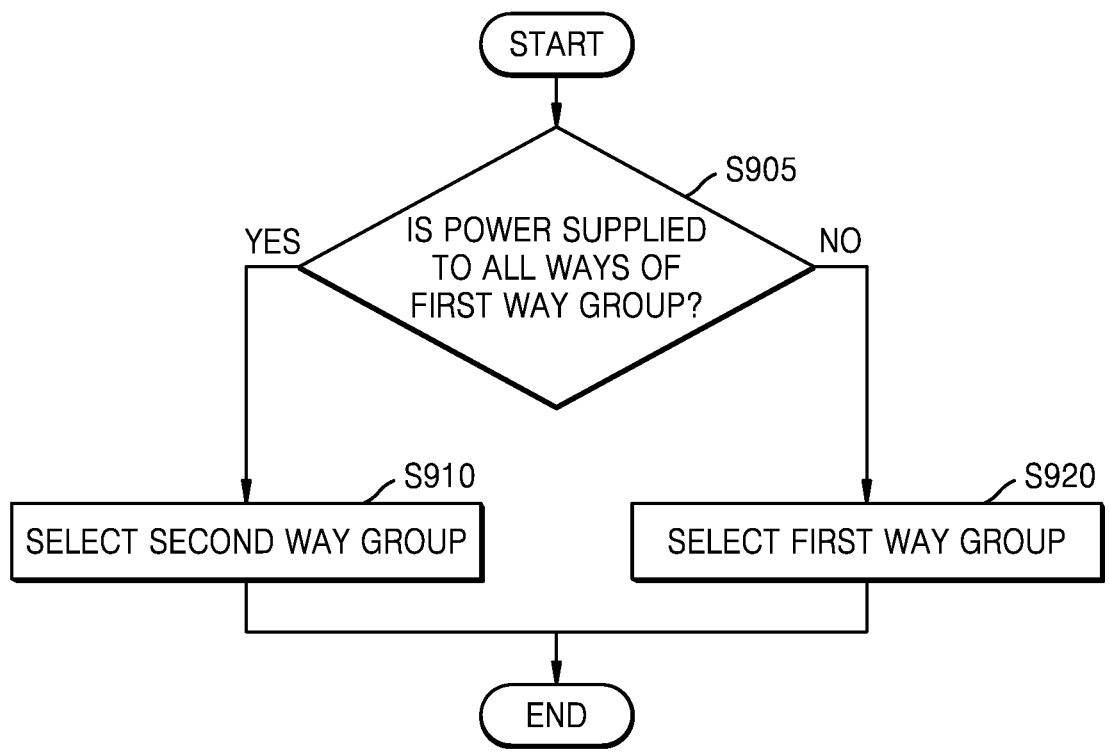

Referring to FIG. 9, the controller 430 may select one of a first way group and a second way group based on whether power is supplied to all ways of the first way group (S905) as an operation state of the set-associative cache. For example, when the first way group has four ways, the phrase of "power is supplied to all ways of the first way group" means that all four ways of the first way group are supplied with power. The controller 430 may preferentially select the first way group (S920) (No) and select the second way group only when power is supplied to all the ways of the first way group (S910) (Yes). By preferentially selecting the first way group with a small power leakage, power consumption of the system 400 may be reduced. In some embodiments, the controller 430 may select the first way group when the power is not supplied to all ways of the first way group (S920) (No), and may select the second way group when the power is supplied to all the ways of the first way group (S910) (Yes).

Figure 10:
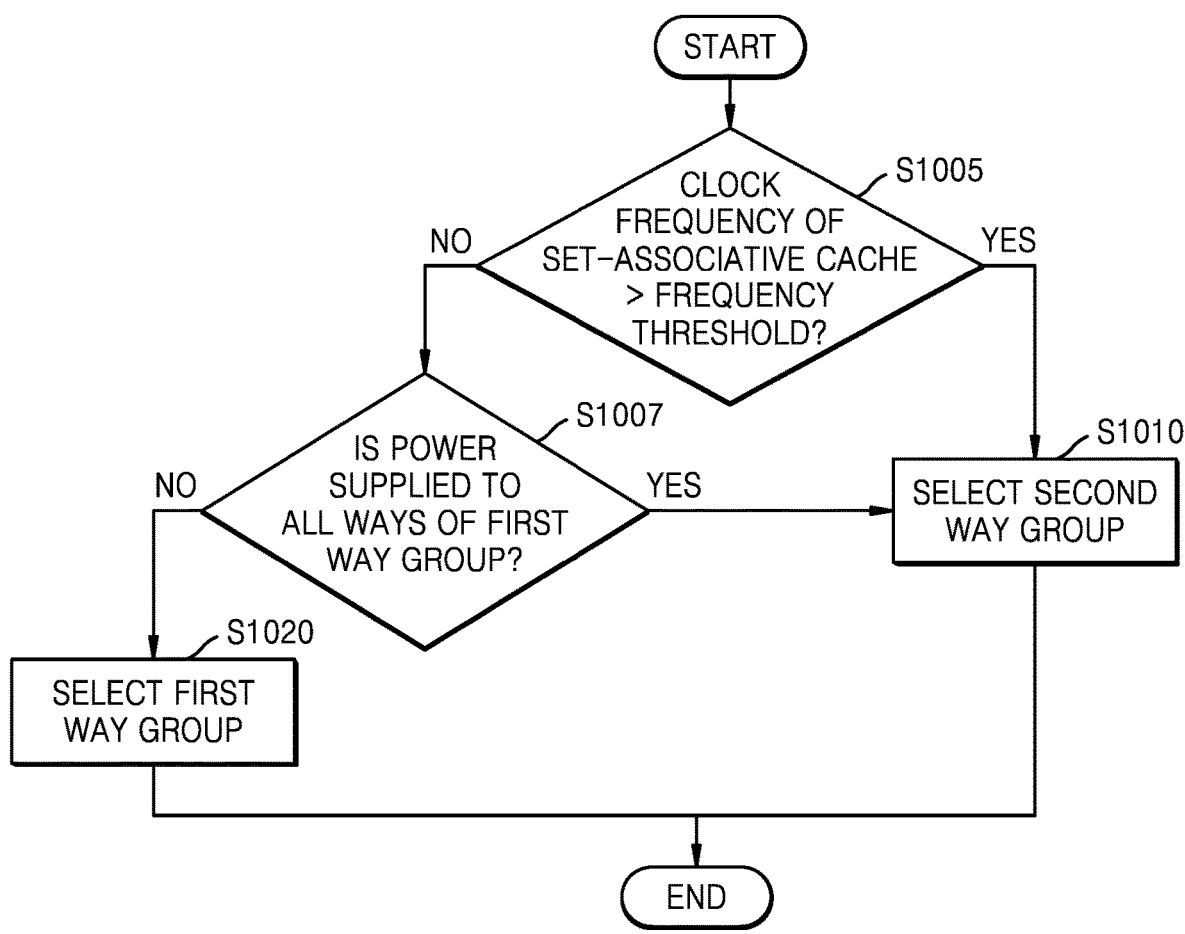

Referring to FIG. 10, the controller 430 may select one of a first way group and a second way group based on comparison between a clock frequency of a set-associative cache with a frequency threshold (S1005) and whether power is supplied to all ways of the first way group (S1007).

When the clock frequency of the set-associative cache is greater than the frequency threshold (Yes), the controller 430 may select the second way group (S1010). When the clock frequency of the set-associative cache is not greater than the threshold value (No), both the first and second way groups may be used because operating speed is not a factor to consider selecting which a way group among the way groups. In this case, the controller 430 may preferentially select the first way group (S1020) (No) and select the second way group only when power is supplied to all the ways of the first way group (S1010) (Yes), and thus, power consumption of the system 400 may be reduced. For example, the controller 430 may select the first way group (S1020) when the power is not supplied to all the ways of the first way group (No) and may select the second way group only when power is supplied to all the ways of the first way group (S1010) (Yes).

Figure 11:
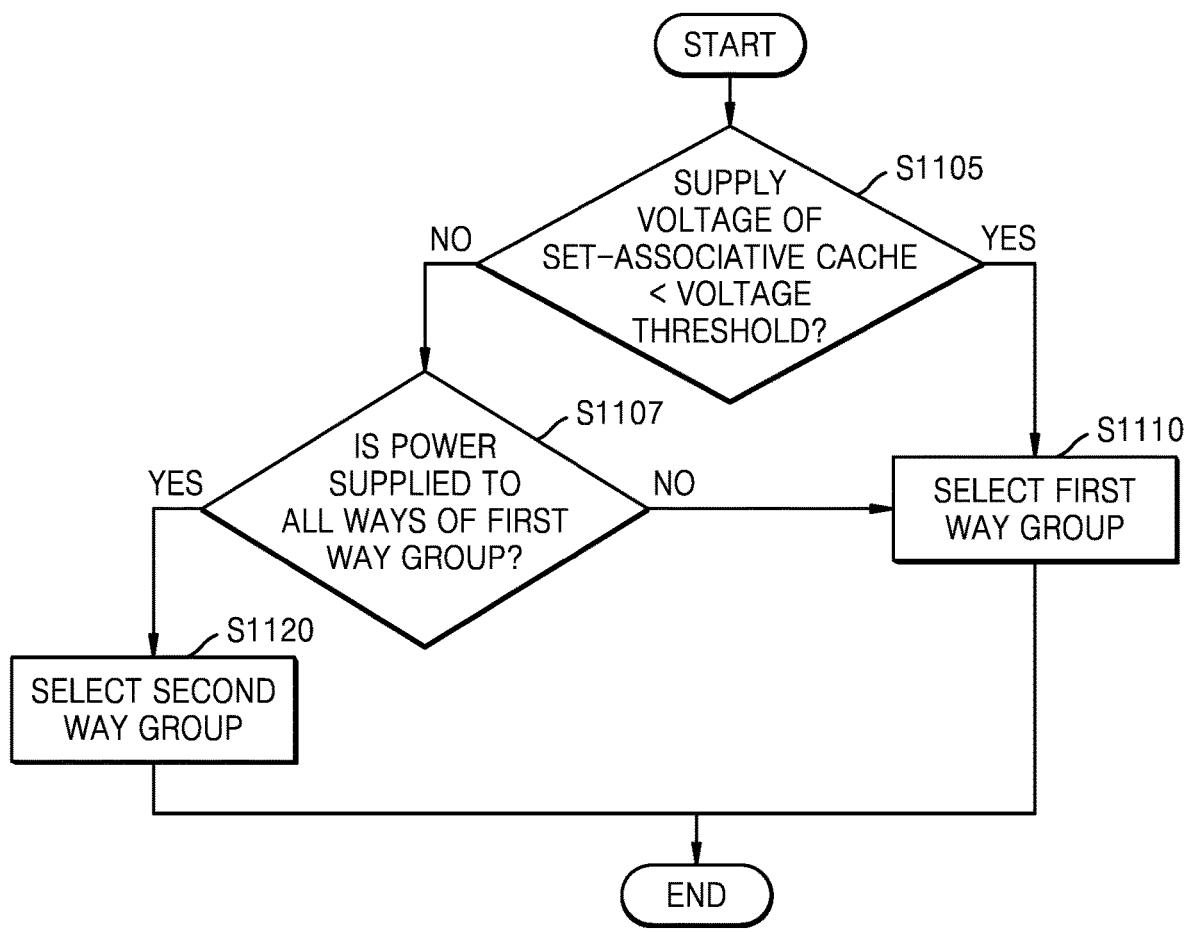

Referring to FIG. 11, the controller 430 may select one of a first way group and a second way group based on comparison between a supply voltage of a set-associative cache and a voltage threshold (S1105) and whether power is supplied to all ways of the first way group (S1107).

When the supply voltage of the set-associative cache is lower than the voltage threshold (Yes), the controller 430 may select the first way group (S1110). When the supply voltage of the set-associative cache is not lower than the voltage threshold (No), power leakage is not a factor to consider selecting which a way group among the way groups, and thus, both the first way group and the second way group may be used. In this case, the controller 430 may preferentially select the first way group (S1110) (No) and select the second way group only when power is supplied to all the ways of the first way group (S1120) (Yes), and thus, power consumption of the system 400 may be reduced. For example, the controller 430 may select the first way group (S1110) when the power is not supplied to all the ways of the first way group (No) and may select the second way group only when power is supplied to all the ways of the first way group (S1120) (Yes).

According to the embodiments of FIGS. 8 to 11, power consumption is prioritized over operating speed, and accordingly, the first way group with less power leakage is preferentially selected. However, it should be understood from other embodiments that, when operating speed is prioritized over power consumption, the second way group with higher speed may be preferentially selected.

Figure 12:
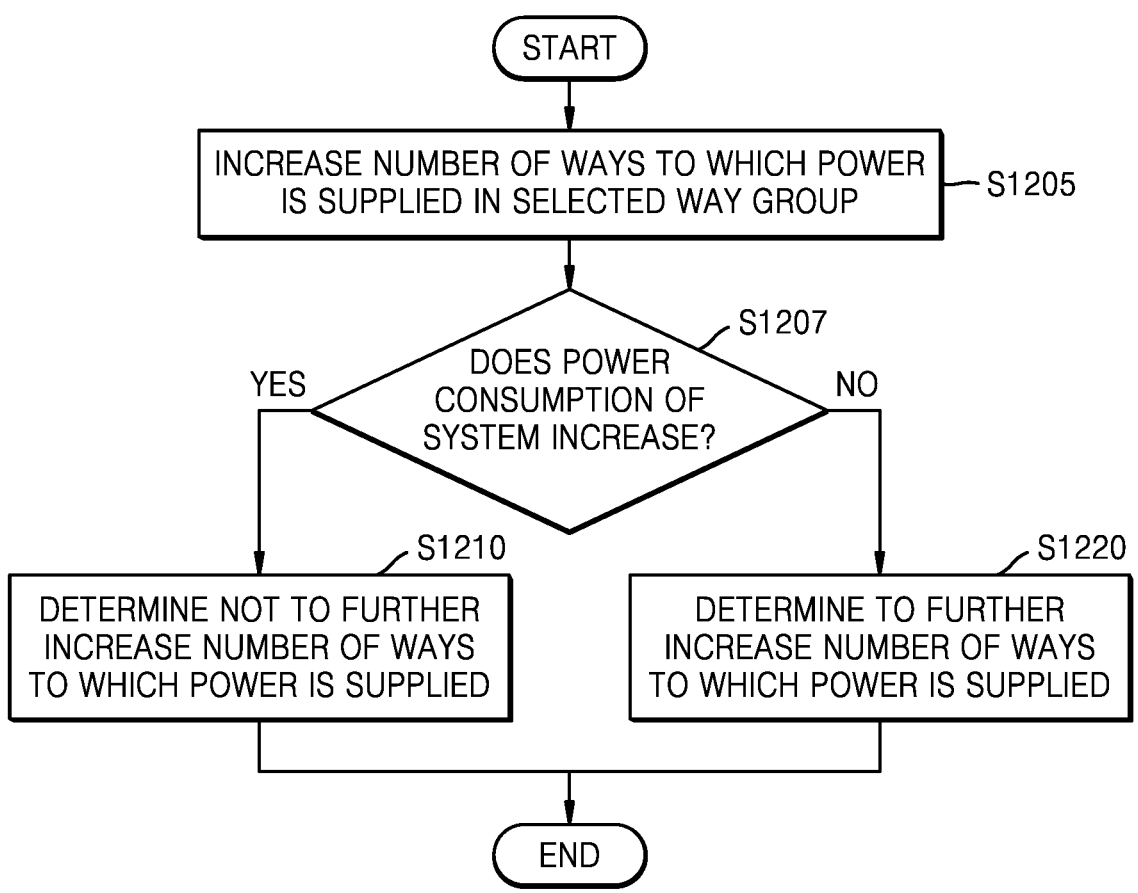
FIGS. 12 to 14 are flowcharts illustrating methods of determining whether to further increase the number of ways to which power is supplied, according to embodiments.
Figure 13:
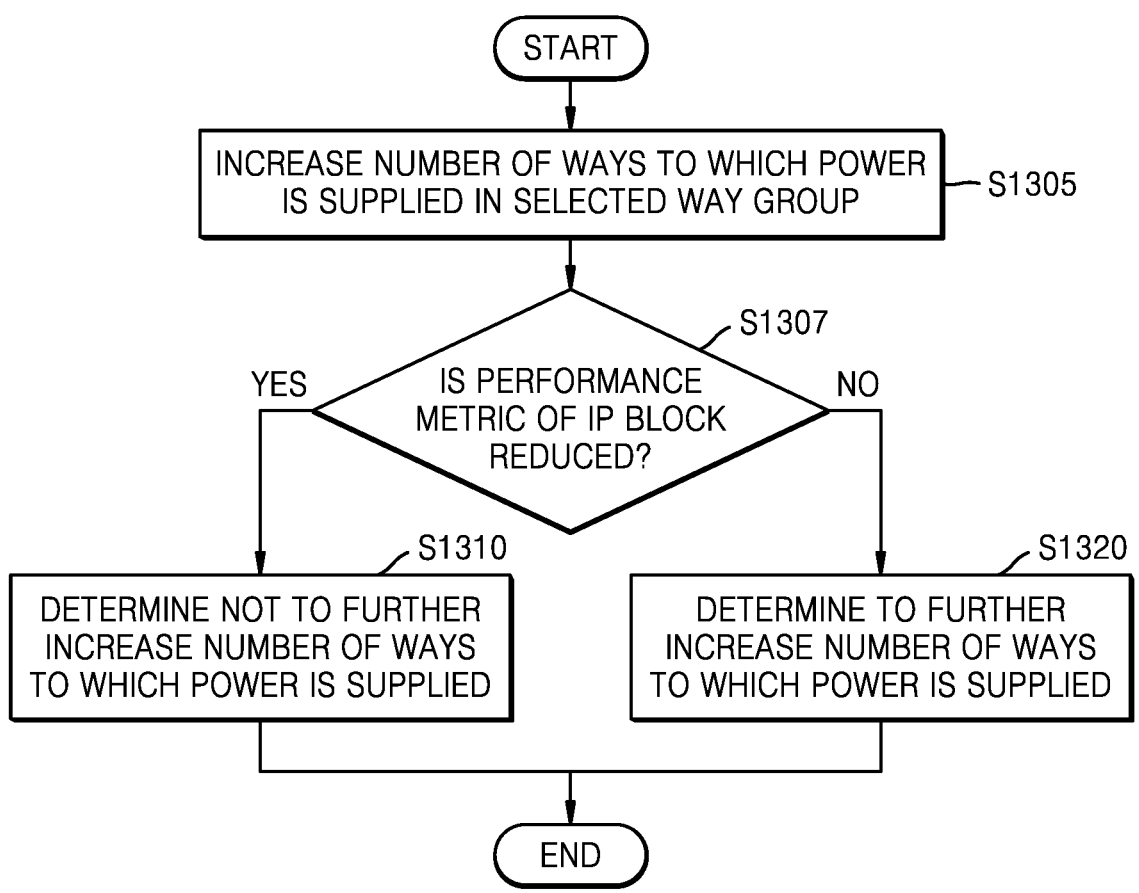
Figure 14:
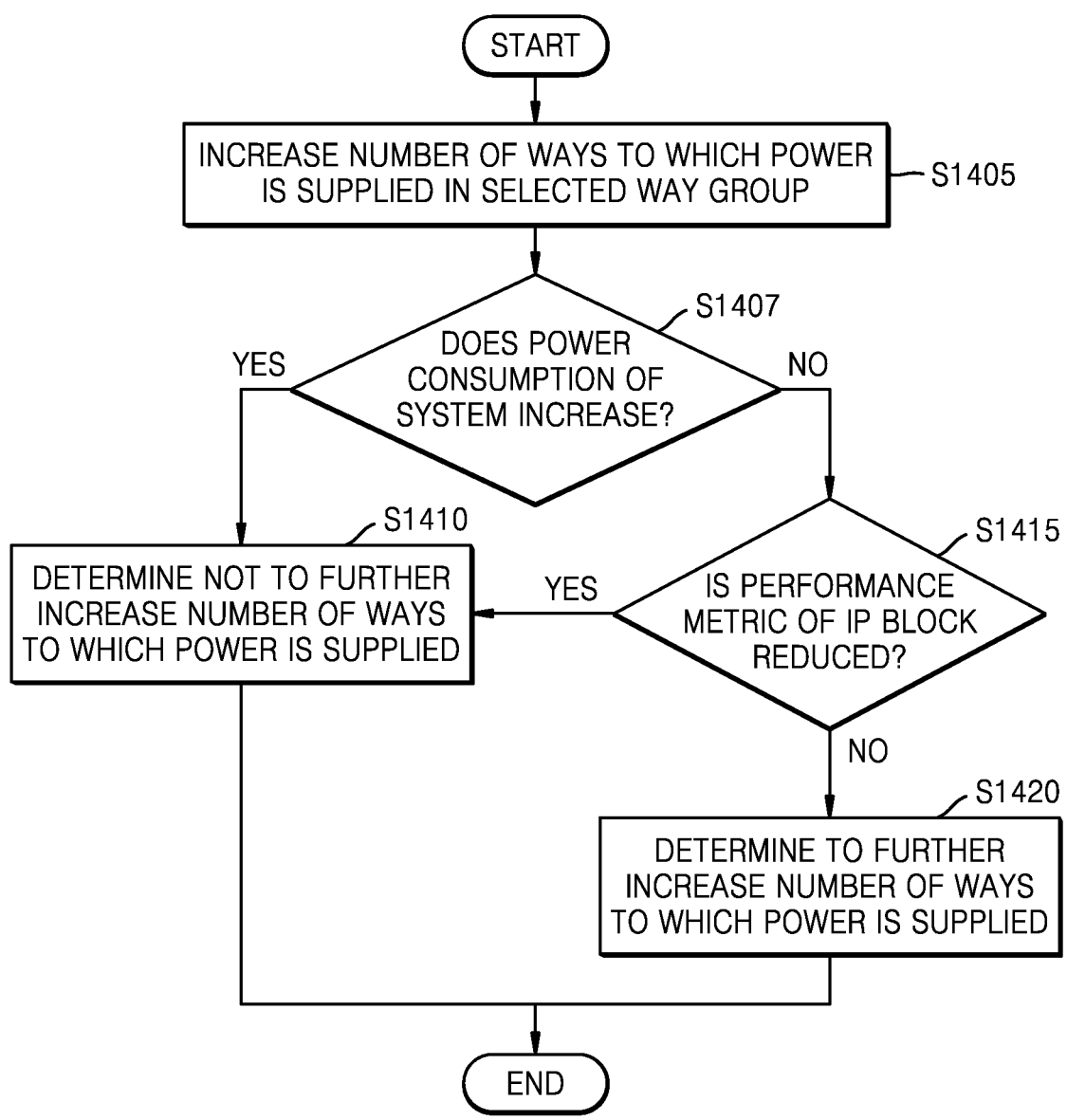

FIGS. 12 to 14 are flowcharts illustrating methods of determining whether to further increase the number of ways to which power is supplied, according to embodiments.

The controller 430 of FIG. 4 may increase the number of ways to which power is supplied in the selected way group (S1205). Here, the selected way group may be a way group selected according to the embodiments with reference to FIGS. 6 to 11. As the number of ways to which power is supplied is changed in the set-associative cache, a performance metric of a set-associative cache may change. For example, a hit ratio of the set-associative cache, power consumption, and so on may change. Accordingly, an operation state of the system 400 may change. The controller 430 may analyze the change in operation state of the system 400 and determine whether to further increase the number of ways to which power is supplied in the selected way group based on the analyzed change in the operation state of the system 400.

Referring to FIG. 12, the controller 430 may analyze whether power consumption of the system 400 increases as an operation state of the system 400 (S1207). When power consumption of the system 400 increases as the number of ways to which power is supplied in the selected way group increases (Yes), the controller 430 may determine not to further increase the number of ways to which power is supplied (S1210). In other cases (No), the controller 430 may determine to further increase the number of ways to which power is supplied (S1220).

Power consumption of the system 400 monitored by the controller 430 may be the total power consumption of the system 400 or power consumption of some modules of the system 400. Some modules may have a major impact on the total power consumption of the system 400.

The controller 430 may analyze a change in power consumption of the memory 420 of FIG. 4 and a change in power consumption of the set-associative cache. Also, the controller 430 may analyze a change in power consumption of at least one of the IP1 block 440 and the IP2 block 450 in FIG. 4. For example, the controller 430 may analyze a change in power consumption by using a power controller for controlling power supply of the system 400.

The controller 430 may determine not to further increase the number of ways to which power is supplied when the sum of power consumption of the memory 420 and power consumption of the set-associative cache increases as the number of ways to which power is supplied increases. The controller 430 may control the use of an appropriate number of ways within a range in which the sum of the power consumption of the memory 420 and the power consumption of the set-associative cache does not increase, and accordingly, the set-associative cache may be used efficiently in terms of power.

When the sum of power consumption of the memory 420, power consumption of the set-associative cache, and power consumption of an IP block increases as the number of ways to which power is supplied increases, the controller 430 may determine not further increase the number of ways to which power is supplied. The power consumption of the IP block may change due to a change in performance metric of the set-associative cache according to an increase in the number of ways to which power is supplied. Although the sum of power consumption of the memory 420 and power consumption of the set-associative cache increases as the number of ways to which power is supplied increases, when power consumption of the IP block is reduced, the total sum of power consumption may be reduced. In this case, because power is a gain, the controller 430 may determine to further increase the number of ways to which power is supplied.

Referring to FIG. 13, the controller 430 may increase the number of ways to which power is supplied in the selected way group (S1305). The controller 430 may analyze performance metric of an IP block as an operation state of the system 400 (S1307). When the performance metric of the IP block is reduced (Yes), the controller 430 may determine not to further increase the number of ways to which power is supplied (S1310). In other cases (No), the controller 430 may determine to further increase the number of ways to which power is supplied (S1320).

For example, the controller 430 may determine to further increase the number of ways to which power is supplied when execution time of a CPU is reduced. For example, the controller 430 may determine not to further increase the number of ways to which power is supplied when a fps of a GPU is reduced.

The determination to further increase the number of ways to which power is supplied may be based on one IP block of higher priority among the IP1 block 440 and the IP2 block 450. For example, when a CPU has a higher priority than a DSP, a change in performance metric of the CPU may be considered prior to a change in performance metric of the DSP. Also, the determination to further increase the number of ways to which power is supplied may be based on a change in performance metric of high priority. For example, when throughput has a higher priority than latency, throughput of a CPU increases, and latency of the CPU is reduced, the controller 430 may determine not to further increase the number of way to which power is supplied by preferentially considering an increase in throughput of the CPU. Priorities of the IP1 block 440 and the IP2 block 450 and priority of the performance metric may be determined in advance.

Referring to FIG. 14, the controller 430 may increase the number of ways to which power is supplied in the selected way group (S1405). The controller 430 may analyze power consumption of the system 400 (S1407) and performance metric of the IP block (S1415) as an operation state of the system 400. When power consumption of the system 400 increases (Yes), the controller 430 may determine not to further increase the number of ways to which power is supplied (S1410), regardless of a change in performance metric of the IP block. The controller 430 may determine whether to increase the number of ways to which power is supplied based on a change in performance metric of the IP block when power consumption of the system 400 does not increase (No). When the performance metric of the IP block is reduced (Yes), the controller 430 may determine not to further increase the number of ways to which power is supplied (S1410). In other cases (No), the controller 430 may determine to further increase the number of ways to which power is supplied (S1420).

Figure 15:
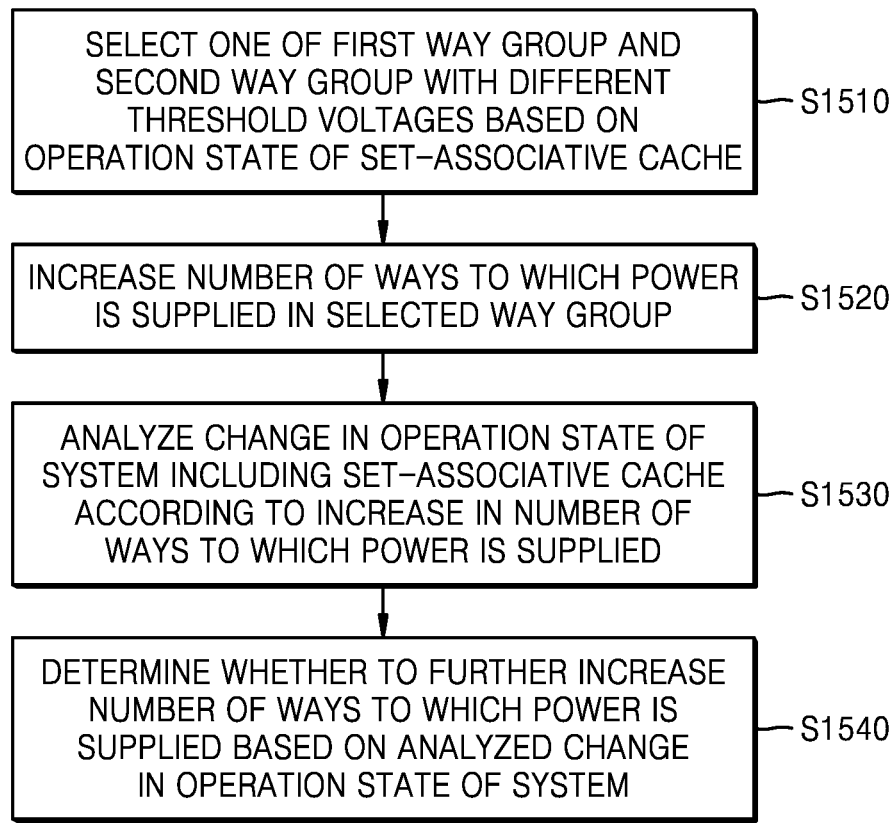
FIG. 15 is a flowchart illustrating an operating method of a set-associative cache, according to an embodiment.

FIG. 15 is a flowchart illustrating an operating method of a set-associative cache, according to an embodiment.

In operation S1510, the controller 430 of FIG. 4 may select one of a first way group and a second way group with different threshold voltages based on an operation state of a set-associative cache. In order to select a way group, the embodiments described with reference to FIGS. 6 to 11 may be used. According to an embodiment, the first way group may be implemented with transistors with a higher threshold voltage than the second way group. Accordingly, the first way group may have a less power leakage and a slower operating speed than the second way group.

In operation S1520, the controller 430 may increase the number of ways to which power is supplied in the selected way group. The number of ways to be increased may be one or more. The controller 430 may increase the number of ways to which power is supplied by controlling power to be supplied to a way to which power is not currently supplied.

In operation S1530, the controller 430 may analyze a change in operation state of the system 400 of FIG. 4 including a set-associative cache as the number of ways to which power is supplied increases. Power consumption of the memory 420, a set-associative cache, and the IP1 block 440 and the IP2 block 450, performance metrics of the IP1 block 440 and the IP2 block 450, and so on may be considered as an operation state of the system 400. Power consumption of the memory 420, the set-associative cache, and the IP1 block 440 and the IP2 block 450 and the performance metrics of the IP1 block 440 and the IP2 block 450 may be analyzed at the same time.

In operation S1540, the controller 430 may determine whether to further increase the number of ways to which power is supplied based on the analyzed change in the operation state of the system 400. Embodiments described with reference to FIGS. 12 to 14 may be used for the determination.

When it is determined to further increase the number of ways to which power is supplied, the controller 430 may repeatedly perform operation S1510 to operation S1540. Operation S1510 to operation S1540 may be performed repeatedly in a unit of previously determined time, in a unit of process, or in a unit of thread until it is determined in operation S1540 not to further increase the number of ways to which power is supplied, or until power is supplied to all ways.

When it is determined not to further increase the number of ways to which power is supplied, the controller 430 may maintain the number of ways to which power is currently supplied. After the unit of previously determined time, the unit of process, or the unit of thread elapses, the controller 430 may perform again operation S1510 to operation S1540.

Figure 16:
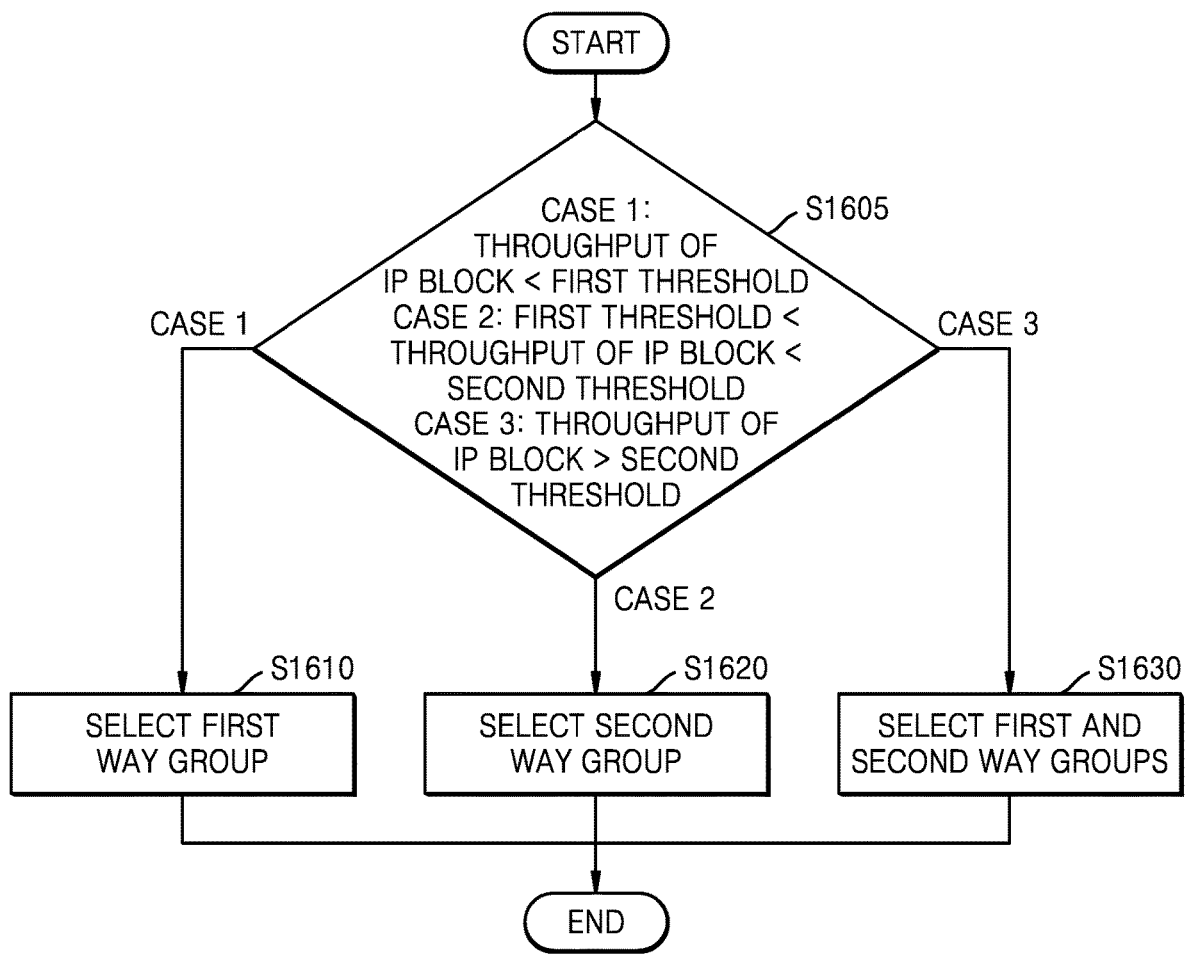
FIG. 16 is a flowchart illustrating a method of selecting a way group, according to an embodiment.

FIG. 16 is a flowchart illustrating a method of selecting a way group, according to an embodiment.

When a throughput of an IP block is high, an operating method of a set-associative cache is required to prevent the system 400 from being delayed. Accordingly, the controller 430 of FIG. 4 may analyze the throughput of the IP block (S1605) and select a way group according to the throughput of the IP block. When the throughput of the IP block is higher than a second threshold (Case 3), the controller 430 may select both the first and second way groups (S1630), and when the throughput of the IP block is higher than a first threshold (Case 2), the controller 430 may select the second way group (S1620), and in other cases (Case 1), the controller 430 may select the first way group (S1610). The second threshold may be greater than the first threshold, and the first and second thresholds may be previously determined.

When the throughput of the IP block is higher than the second threshold, both the first and second way groups may be selected for the greatest cache hit rate. When the throughput of the IP block is higher than the first threshold, the second way group with a lower threshold voltage may be selected for high-speed operation. In other cases, the first way group with a higher threshold voltage may be selected by considering power consumption.

Figure 17:
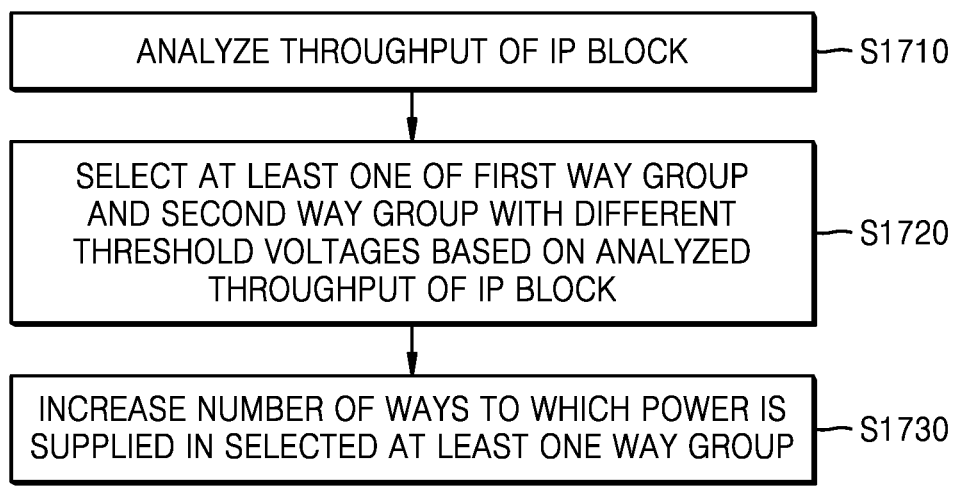
FIG. 17 is a flowchart illustrating an operating method of a set-associative cache, according to an embodiment.

FIG. 17 is a flowchart illustrating an operating method of a set-associative cache, according to an embodiment.

In operation S1710, the controller 430 of FIG. 4 may analyze a throughput of an IP block. For example, the controller 430 may analyze throughput of a CPU or throughput of a GPU.

In operation S1720, the controller 430 may select at least one of a first way group and a second way group with different threshold voltages based on the throughput of the analyzed IP block. The embodiment described with reference to FIG. 16 may be used for selection.

In operation S1730, the controller 430 may increase the number of ways to which power is supplied in the selected at least one way group.

According to an embodiment, when the first and second way groups are selected, the controller 430 may supply power to all ways of the first and second way groups. In this case, high throughput of the IP block may be supported by all ways of the first and second way groups.

According to another embodiment, when the second way group is selected, the controller 430 may supply power to all ways of the second way group. In this case, high throughput of the IP block may be supported by a fast second way group. In this case, the controller 430 may supply power to the first way group as needed.

When the first way group is selected, the controller 430 may increase the number of ways to which power is supplied in the first way group. In this case, power consumption of the system 400 may be reduced by the first way group with less power leakage.

The embodiments described above may be implemented by hardware components, software components, and/or a combination of the hardware components and the software components. For example, the devices, methods, and components described in the embodiments may be implemented by using a general-purpose computer or a special-purpose computer, such as a processor, a controller, an arithmetic logic unit (ALU), a digital signal processor, a microcomputer, a field programmable gate array FPGA, a programmable logic unit (PLU), a microprocessor, and any other device capable of executing instructions and responding thereto. A processing device may execute an operating system (OS) and a software application running on the OS. Also, the processing device may also access, store, manipulate, process, and generate data in response to execution of software. For the sake of convenience of understanding, one processing device may be used, but those skilled in the art will understand that the processing device includes a plurality of processing elements and/or a plurality of types of processing elements. For example, the processing device may include a plurality of processors or a processor and one controller. Other processing configurations, such as parallel processors, may be used.

Software may include a computer program, codes, instructions, or any combination thereof and configures a processing device to operate as desired or may instruct a processing device to operate independently or collectively. Software and/or data may be permanently or temporarily embodied by any type of machine, component, physical device, virtual equipment, computer storage medium or device, or a signal wave that is transmitted so as to be interpreted by a processing device or provide instructions or data to the processing device. Software may be distributed on networked computer systems and stored or executed in a distributed manner. Software and data may be stored in computer-readable media.

The methods according to the embodiments may be implemented in the form of program instructions that may be executed through various computers and recorded on computer-readable media. Computer-readable media may include program instructions, data files, data structures, and so on alone or in combination. Program commands recorded on media may be specially designed and configured for embodiments or may be known and usable to those skilled in computer software. Computer-readable recording media may include, for example, magnetic media, such as a hard disk, a floppy disk, and a magnetic tape, optical media, such as compact disk read-only memory (CD-ROM) and a digital video disk (DVD), magneto-optical media, such as floptical disks, and hardware devices, which are specially configured to store and execute program instructions, such as ROM, RAM, and flash memory. For example, program instructions include not only machine language codes, such as codes generated by a compiler, but also high-level language codes that may be executed by a computer using an interpreter.

The operating method of a set-associative cache according to the inventive concept may reduce power consumption of a system by preferentially using a first way group with less power leakage.

In addition, when a high-speed operation is required, a high-speed second way group is preferentially used, and thus, a system may be prevented from being delayed.

In addition, by adjusting the number of ways to which power is supplied by considering power consumption of a system, a set-associative cache may operate efficiently in terms of power.

Effects that may be obtained by the embodiments are not limited to the effects described above, and other effects not described above may be clearly derived and understood from the description of the embodiments by those skilled in the art to which the embodiments belong. That is, unintended effects according to the embodiments may also be derived by those skilled in the art from the embodiments.

While the inventive concept has been particularly shown and described with reference to embodiments thereof, it will be understood that various changes in form and details may be made therein without departing from the spirit and scope of the following claims.

What is claimed is:

1. An operating method of a set-associative cache, the operating method comprising:
   selecting, based on an operation state of the set-associative cache, one way group from among a first way group and a second way group with different threshold voltages,
   wherein the first way group and the second way group are in the same set of the set-associative cache,
   wherein the first way group includes a first number of a plurality of first ways having a plurality of first transistors having a first threshold voltage, and
   wherein the second way group includes a second number of a plurality of second ways having a plurality of second transistors having a second threshold voltage different from the first threshold voltage;
   increasing a number of ways of the selected one way group to which power is supplied;
   analyzing a change in an operation state of a system including the set-associative cache as the number of ways of the selected one way group to which the power is supplied is increased; and
   determining, based on an analyzed change in the operation state of the system, whether to further increase the number of ways of the selected one way group that the power is supplied.

2. The operating method of claim 1,
   wherein the selecting of the one way group comprises selecting the second way group having the plurality of second transistors with the second threshold voltage lower than the first threshold voltage when a clock frequency of the set-associative cache is greater than a frequency threshold.

3. The operating method of claim 1,
   wherein the selecting of the one way group comprises selecting the first way group having the plurality of first transistors with the first threshold voltage higher than the second threshold voltage when a supply voltage of the set-associative cache is less than a voltage threshold.

4. The operating method of claim 1,
   wherein the selecting of the one way group comprises:
   selecting the first way group when the power is not supplied to all of the first number of the plurality of first ways of the first way group; and
   selecting the second way group when the power is supplied to all of the first number of the plurality of first ways of the first way group.

5. The operating method of claim 1,
   wherein the first way group includes regular voltage threshold (RVT)-based static random access memory (SRAM), and the second way group includes low voltage threshold (LVT)-based SRAM.

6. The operating method of claim 1,
   wherein the analyzing of the change comprises analyzing a change in power consumption of the system.

7. The operating method of claim 6,
   wherein the analyzing of the change in the power consumption of the system comprises analyzing a change in power consumption of a memory of the system and a change in power consumption of the set-associative cache.

8. The operating method of claim 6,
   wherein the analyzing of the change in the power consumption of the system comprises analyzing a change in power consumption of an IP block of the system.

9. The operating method of claim 1,
   wherein the analyzing of the change comprises analyzing a change in performance metric of an IP block of the system.

10. The operating method of claim 9,
    wherein the performance metric of the IP block comprises at least one of changes in execution time, frame per second (fps), instruction per clock (IPC), response time, latency, throughput, and performance per watt of the IP block.

11. The operating method of claim 1,
    wherein the determining of whether to further increase the number of ways of the selected one way group to which the power is supplied comprises:
    determining not to further increase the number of ways of the selected one way group to which the power is supplied when, as the number of ways of the selected one way group to which the power is supplied increases, power consumption of the system increases.

12. The operating method of claim 1,
    wherein the determining of whether to further increase the number of ways of the selected one way group to which the power is supplied comprises:
    determining not to further increase the number of ways of the selected one way group to which the power is supplied when, as the number of ways of the selected one way group to which the power is supplied increases, a sum of power consumption of a memory of the system and power consumption of the set-associative cache increases.

13. The operating method of claim 1,
    wherein the determining of whether to further increase the number of ways of the selected one way group to which the power is supplied comprises:
    determining not to further increase the number of ways of the selected one way group to which the power is supplied when, as the number of ways of the selected one way group to which the power is supplied increases, a sum of power consumption of a memory of the system, power consumption of the set-associative cache, and power consumption of an IP block of the system increases.

14. The operating method of claim 1,
wherein the determining of whether to further increase the number of ways of the selected one way group to which the power is supplied comprises:
determining not to further increase the number of ways of the selected one way group to which the power is supplied when, as the number of ways of the selected one way group to which the power is supplied increases, a performance metric of an IP block of the system is reduced.

15. The operating method of claim 1,
wherein the determining of whether to further increase the number of ways of the selected one way group to which the power is supplied comprises:
determining not to further increase the number of ways of the selected one way group to which the power is supplied regardless of a change in performance metric of an IP block of the system when, as the number of ways to which the power is supplied increases, power consumption of the system increases.

16. A system comprising:
a set-associative cache; and
a controller configured to perform an operating method of the set-associative cache,
wherein the controller is configured to:
select, based on an operation state of the set-associative cache, one way group from among a first way group and a second way group with different threshold voltages,
wherein the first way group and the second way group are the same set of the set-associative cache,
wherein the first way group includes a plurality of first transistors having a first threshold voltage and a first number of a plurality of ways, and
wherein the second way group includes a plurality of second transistors having a second threshold voltage different from the first threshold voltage and a second number of a plurality of ways;
increase a number of ways of the selected one way group to which power is supplied;
analyze a change in an operation state of a system including the set-associative cache as the number of ways of the selected one way group to which the power is supplied is increased; and
determine whether to further increase the number of ways of the selected one way group to which the power is supplied based on an analyzed change in the operation state of the system.

17. The system of claim 16, further comprising:
at least one IP block; and
a memory,
wherein the controller includes one of a cache controller and a power controller.

18. An operating method of a set-associative cache, the operating method comprising:
analyzing throughput of an IP block;
selecting, based on an analyzed throughput of the IP block, at least one way group from among a first way group and a second way group with different threshold voltages,
wherein the first way group and the second way group are in the same set of the set-associative cache,
wherein the first way group includes a first number of a plurality of first ways having a plurality of first transistors having a first threshold voltage, and
wherein the second way group includes a second number of a plurality of second ways having a plurality of second transistors having a second threshold voltage different from the first threshold voltage; and
increasing a number of ways of the selected at least one way group to which power is supplied.

19. The operating method of claim 18,
wherein the selecting of the at least one way group comprises:
selecting the second way group having the plurality of second transistors of the second threshold voltage lower than the first threshold voltage when the throughput of the IP block is greater than a first threshold, and
wherein the increasing of the number of ways of the selected at least one way group comprises:
supplying the power to all of the second number of the plurality of second ways of the second way group.

20. The operating method of claim 19, wherein:
the selecting of the second way group comprises selecting both the first way group and the second way group when the throughput of the IP block is greater than a second threshold,
the increasing of the number of ways of the selected at least one way group comprises supplying the power to all of the first number of the plurality of first ways of the first way group and all of the second number of the plurality of second ways of the second way group, and
the second threshold is greater than the first threshold.

* * * * *